(12) United States Patent
Sohn et al.

(10) Patent No.: US 10,809,524 B2
(45) Date of Patent: Oct. 20, 2020

(54) VARIFOCAL APPARATUSES, SYSTEMS, AND METHODS EMPLOYING A DEFORMABLE STEPPED LENS

(71) Applicant: FACEBOOK TECHNOLOGIES, LLC, Menlo Park, CA (US)

(72) Inventors: Alexander Sohn, Seattle, WA (US); Nelson Cardenas, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 278 days.

(21) Appl. No.: 15/925,720

(22) Filed: Mar. 19, 2018

(65) Prior Publication Data

US 2019/0212546 A1     Jul. 11, 2019

Related U.S. Application Data

(60) Provisional application No. 62/614,886, filed on Jan. 8, 2018.

(51) Int. Cl.
*G02B 26/08*     (2006.01)
*G02B 26/10*     (2006.01)
(Continued)

(52) U.S. Cl.
CPC ........... *G02B 26/0875* (2013.01); *G02B 3/08* (2013.01); *G02B 3/14* (2013.01); *G02B 27/0093* (2013.01);
(Continued)

(58) Field of Classification Search
CPC .............. G02B 26/0841; G02B 26/085; G02B 26/105; G02B 26/101; G02B 26/0858; G02B 26/0816; B81B 2201/042; B81B 2201/033; B81B 2203/058; B81B 2203/0109; B81B 2203/0163;
(Continued)

(56) References Cited

U.S. PATENT DOCUMENTS 6,493,151 B2   12/2002   Schachar
7,428,114 B2    9/2008   Yu
(Continued)

FOREIGN PATENT DOCUMENTS

WO     2019/135936 A1    7/2019

OTHER PUBLICATIONS

International Search Report and Written Opinion received for PCT Application Serial No. PCT/US2018/066935 dated Apr. 12, 2019, 21 pages.
(Continued)

*Primary Examiner* — William R Alexander
*Assistant Examiner* — Tamara Y. Washington
(74) *Attorney, Agent, or Firm* — FisherBroyles, LLP

(57) ABSTRACT

The disclosed apparatus may include (1) a deformable stepped lens that (a) provides a first optical power when a shape of the deformable stepped lens includes a first state, and (b) provides a second optical power different from the first optical power when the shape of the deformable stepped lens includes a second state different from the first state and (2) an actuator coupled to the deformable stepped lens that, when actuated, applies force to the deformable stepped lens to alter the shape of the deformable stepped lens from the first state to the second state. Various other apparatuses, systems, and methods are also disclosed.

20 Claims, 12 Drawing Sheets

US 10,809,524 B2
Page 2

(51) Int. Cl.
*G02B 26/12* (2006.01)
*G02B 3/14* (2006.01)
*G02C 7/08* (2006.01)
*G02B 27/01* (2006.01)
*G02B 27/00* (2006.01)
*G02B 3/08* (2006.01)

(52) U.S. Cl.
CPC ......... *G02B 27/0172* (2013.01); *G02C 7/081* (2013.01); *G02B 2027/0181* (2013.01); *G02B 2027/0185* (2013.01); *G02C 2202/20* (2013.01)

(58) Field of Classification Search
CPC ........... B81B 7/0006; H01L 2924/0002; H01L 2924/00; H01L 2924/00012
USPC ...................................... 359/221.2
See application file for complete search history.

(56) References Cited

U.S. PATENT DOCUMENTS

| | | | |
|---|---|---|---|
| 7,663,811 B2 | 2/2010 | Noda et al. | |
| 7,684,121 B2 | 3/2010 | Chen | |
| 8,073,320 B2 | 12/2011 | Topliss et al. | |
| 8,116,018 B2 | 2/2012 | Park et al. | |
| 8,159,762 B2 | 4/2012 | Lim et al. | |
| 8,395,855 B2 | 3/2013 | Topliss | |
| 8,692,929 B2 | 4/2014 | Hata et al. | |
| 8,919,953 B1 | 12/2014 | Ho | |
| 9,039,760 B2* | 5/2015 | Brady ................... | A61F 2/1635 623/6.11 |
| 9,848,980 B2* | 12/2017 | McCafferty ........... | A61F 2/1629 |
| 10,045,844 B2* | 8/2018 | Smiley .................. | A61F 2/1635 |
| 10,307,247 B2* | 6/2019 | McCafferty ........... | A61F 2/1629 |
| 2001/0022688 A1 | 9/2001 | Kosaka et al. | |
| 2004/0164927 A1 | 8/2004 | Suyama et al. | |
| 2006/0113868 A1* | 6/2006 | Sakatani ............. | H01L 41/0913 310/323.17 |
| 2006/0245073 A1 | 11/2006 | Yu | |
| 2007/0058070 A1 | 3/2007 | Chen | |
| 2008/0144185 A1* | 6/2008 | Wang ................. | H04N 5/23212 359/665 |
| 2009/0005865 A1* | 1/2009 | Smiley .................. | A61F 2/1635 623/6.13 |
| 2009/0103194 A1 | 4/2009 | Chen | |
| 2011/0128434 A1 | 6/2011 | Hata et al. | |
| 2013/0030525 A1* | 1/2013 | Brady ................... | A61F 2/1635 623/6.43 |
| 2014/0330375 A1* | 11/2014 | McCafferty ........... | A61F 2/1629 623/6.23 |
| 2015/0070481 A1* | 3/2015 | S ........................... | G06F 3/013 348/78 |
| 2015/0335420 A1 | 11/2015 | Blum et al. | |
| 2016/0051361 A1* | 2/2016 | Phillips ................. | A61F 2/1629 623/6.34 |
| 2016/0374799 A1* | 12/2016 | McCafferty ........... | A61F 2/1651 623/6.34 |
| 2017/0160518 A1 | 6/2017 | Lanman et al. | |
| 2017/0219842 A1 | 8/2017 | Howarth et al. | |
| 2017/0299945 A1 | 10/2017 | Suzuki et al. | |
| 2017/0329398 A1* | 11/2017 | Raffle ................ | G02B 27/0093 |
| 2017/0332004 A1 | 11/2017 | Kang et al. | |
| 2017/0336646 A1 | 11/2017 | Miller et al. | |
| 2018/0008400 A9* | 1/2018 | McCafferty ........... | A61F 2/1648 |
| 2018/0071082 A1* | 3/2018 | McCafferty ........... | A61F 2/1651 |

OTHER PUBLICATIONS

International Preliminary Report on Patentability received for PCT Application Serial No. PCT/US2018/066935 dated Jul. 23, 2020, 14 pages.

* cited by examiner

Head-Mounted
Display
500

Display
System
501

Method 1200

VARIFOCAL APPARATUSES, SYSTEMS, AND METHODS EMPLOYING A DEFORMABLE STEPPED LENS

CROSS REFERENCE TO RELATED APPLICATION

This application claims the benefit of U.S. Provisional Application No. 62/614,886, filed Jan. 8, 2018, the disclosure of which is incorporated, in its entirety, by this reference.

BACKGROUND

To provide a more realistic virtual reality (VR) experience for viewers, some head-mounted display (HMD) designers have begun to propose varifocal optical systems to induce the accommodation reflex or response in the eye of the viewer to mimic the effect of the eye of the viewer focusing on virtual objects that are varied in distance from the viewer. Some proposed systems may employ motors to alter various intercomponent distances to achieve such an effect. For example, distances between the eye of the viewer and the display, distances between the display or the eye and one or more lenses or other optical components, or distances between individual optical components may be altered over time to mimic the varying distances of virtual objects from the viewer by causing the eye of the viewer to focus on the virtual object (e.g., by shaping of the human lens, by contracting or dilating the human pupil, and so on) in a manner similar to that in the real world. Such systems may require a significant level of power and space to implement within an HMD system or other optical device.

SUMMARY

As will be described in greater detail below, the instant disclosure describes varifocal apparatuses, systems, and methods employing a deformable stepped lens. For example, an apparatus may include (1) a deformable stepped lens that (a) provides a first optical power when a shape of the deformable stepped lens comprises a first state, and (b) provides a second optical power different from the first optical power when the shape of the deformable stepped lens comprises a second state different from the first state, and (2) an actuator coupled to the deformable stepped lens that, when actuated, applies force to the deformable stepped lens to alter the shape of the deformable stepped lens from the first state to the second state.

In some embodiments, the actuator may apply the force about a perimeter of the deformable stepped lens toward a center of the deformable stepped lens. Moreover, in some examples, the force applied by the actuator may move the center of the deformable stepped lens either (1) toward an eye of a viewer so that the second optical power is greater than the first optical power, or (2) away from the eye of the viewer so that the second optical power is less than the first optical power. In some embodiments, the actuator may include (1) a ring, (2) a plurality of pads contacting the perimeter of the deformable stepped lens, (3) a plurality of flexures connecting the plurality of pads to the ring, and (4) a first shape-memory alloy (SMA) wire routed about the actuator via at least one of (a) one or more of the plurality of pads, or (b) one or more of the plurality of flexures, and the first SMA wire applies the force in response to carrying electrical current. Further, in some examples, the actuator may further include a second SMA wire routed about the actuator at the plurality of pads, where (1) the second SMA wire applies a second force about the perimeter of the deformable stepped lens toward the center of the deformable stepped lens in response to carrying electrical current, and (2) the second SMA wire is located relative to the first SMA wire such that the second force causes the center of the deformable stepped lens to move in an opposite direction to that caused by the force applied by the first SMA wire. Moreover, in some embodiments, the first SMA wire and the second SMA wire may be located on opposing sides of a plane defined by the perimeter of the deformable stepped lens.

In some examples, the perimeter of the deformable stepped lens may be circular, and the plurality of flexures may be of a same thickness such that (1) the same force is applied at each of the plurality of pads onto the perimeter of the deformable stepped lens, and (2) the shape of the deformable stepped lens is symmetrical about the center of the deformable stepped lens when the deformable stepped lens is in a deformed state as a result of the force being applied at each of the plurality of pads. In other embodiments, the perimeter of the deformable stepped lens may not be circular, and the plurality of flexures may vary in thickness to apply differing forces at the plurality of pads onto the perimeter of the deformable stepped lens so that the shape of the deformable stepped lens is symmetrical about the center of the deformable stepped lens when the deformable stepped lens is in a deformed state as a result of the force applied at each of the plurality of pads.

In various embodiments, the actuator may apply the force in a manner that results in (1) a first force vector being applied at a first portion of the deformable stepped lens, and (2) a second force vector being applied at a second portion of the deformable stepped lens. In some examples, the first force vector may include a direction component that is different than a direction component of the second force vector. Also in some examples, the actuator may include a plurality of actuators that has (1) a first actuator that applies the first force vector to the first portion of the deformable stepped lens, and (2) a second actuator that applies the second force vector to the second portion of the deformable stepped lens. In some embodiments, the apparatus may further include an aperture mechanism that (1) is coupled to the deformable stepped lens at a plurality of different locations, where the plurality of different locations comprises the first and second portions of the deformable stepped lens, and (2) when actuated by the actuator, applies the force to the deformable stepped lens at each of the plurality of different locations.

In some examples, the apparatus may also include a rigid lens that is located between the deformable stepped lens and an eye of a viewer and that provides an additional optical power, where the rigid lens is dimensioned to compensate for a thickness of the deformable stepped lens that differs as a function of a radius of the deformable stepped lens.

In various embodiments, the deformable stepped lens may include at least one substantially flat side, and a side of the deformable stepped lens opposite the substantially flat side may include a plurality of concentric ridges.

In some examples, the apparatus may further include (1) a display subsystem that generates an image for viewing by a viewer, where the actuator holds the deformable stepped lens between a display and an eye of the viewer, (2) a control subsystem that directs the actuator to apply the force to the deformable stepped lens, and (3) a deflectometry subsystem that measures a current state of the shape of the deformable stepped lens, where the control subsystem selects the force applied to the deformable stepped lens based, at least in part, on the current state of the shape of the deformable stepped lens.

In another example, a method may include (1) identifying an amount of force to be applied to a deformable stepped lens, and (2) directing an actuator to apply the identified amount of force to the deformable stepped lens to alter a shape of the deformable stepped lens from a first state to a second state, where (a) the deformable stepped lens includes a first optical power in the first state, (b) the deformable stepped lens comprises a second optical power in the second state, and (c) the first optical power is different than the second optical power. In some embodiments, identifying the amount of force may include (1) detecting a level of focus of an image being projected through the deformable stepped lens onto an eye of a viewer, and (2) determining, based on the level of focus, the amount of force to be applied to the deformable stepped lens. In other examples, identifying the amount of force may include (1) receiving, at an input subsystem, information about an optical correction prescription of a viewer, and (2) determining, based at least in part on the optical correction prescription, the amount of force to be applied to the deformable stepped lens. In some further embodiments, receiving the information about the optical correction prescription may include receiving information about a cylindrical component of the optical correction prescription, determining the amount of force to be applied may be based on the cylindrical component, the first optical power may include a first cylindrical power, and the second optical power may include a second cylindrical power that is different than the first cylindrical power and that at least partially corrects for an astigmatism of the viewer.

In another example, a method may include (1) mechanically coupling an actuation subsystem to a deformable stepped lens that, when held in a first state by the actuation subsystem, has a shape that provides a first optical power, and (2) communicatively coupling, to the actuation subsystem, a control subsystem that directs the actuation subsystem to apply a force to the deformable stepped lens, where (a) the force alters the shape of the deformable stepped lens from the first state to a second state and (b) the deformable stepped lens, when held in a second state by the actuation subsystem, provides a second optical power that is different than the first optical power.

Features from any of the above-mentioned embodiments may be used in combination with one another in accordance with the general principles described herein. These and other embodiments, features, and advantages will be more fully understood upon reading the following detailed description in conjunction with the accompanying appendices.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
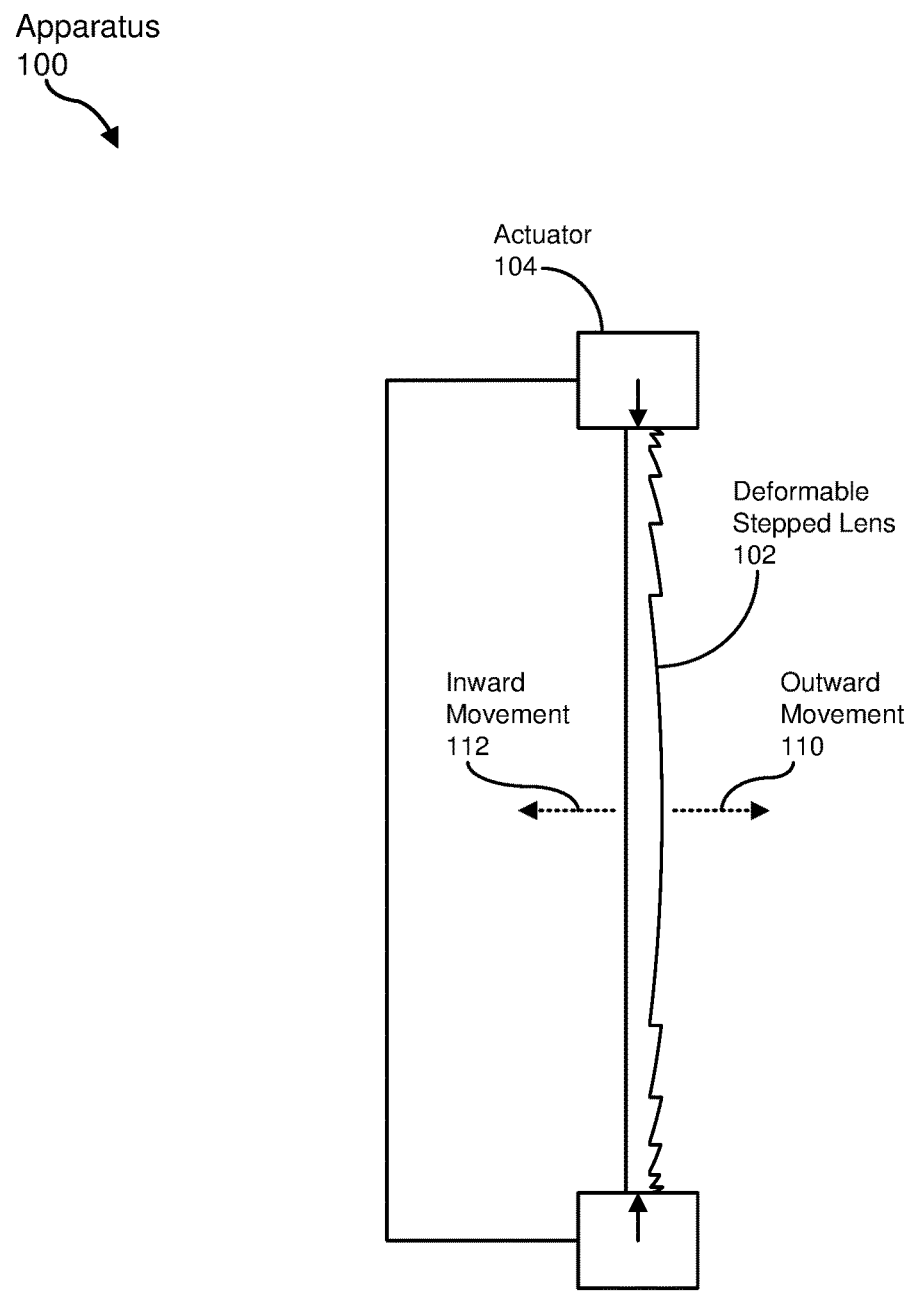
FIG. 1 is a cross-sectional view of an exemplary varifocal apparatus employing a deformable stepped lens.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to varifocal apparatuses, systems, and methods employing a deformable stepped lens. In some examples, by employing an actuator to apply at least one force to deform the lens (e.g., by applying radial force to one or more locations along a perimeter of the lens toward the center of the lens), the shape of the lens may be altered from one state to another, thus altering the optical power and/or focal length of the lens. As will be explained in greater detail below, embodiments of the instant disclosure may facilitate a low-power, low-volume varifocal system that may be implemented in a virtual reality display system, such as an HMD.

Figure 3:
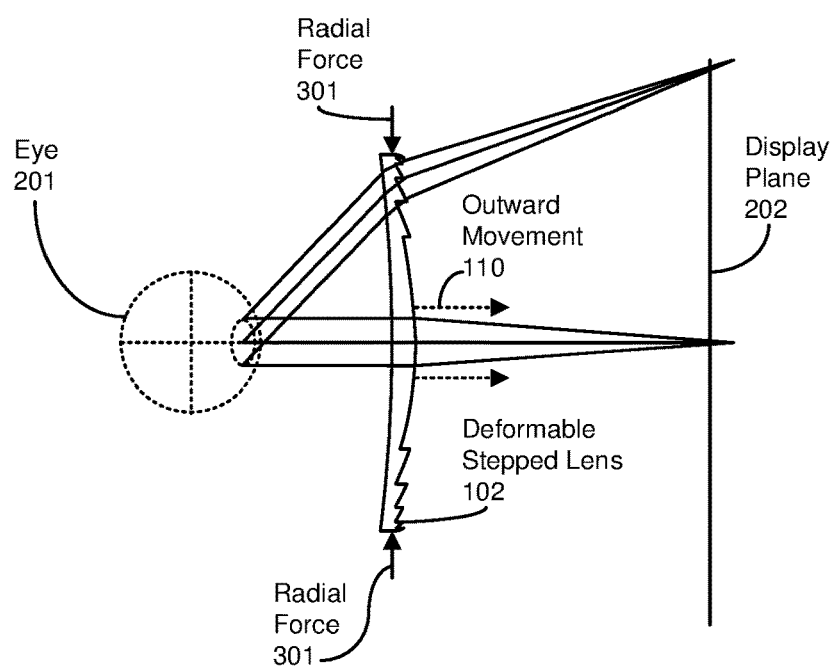
Figure 4:
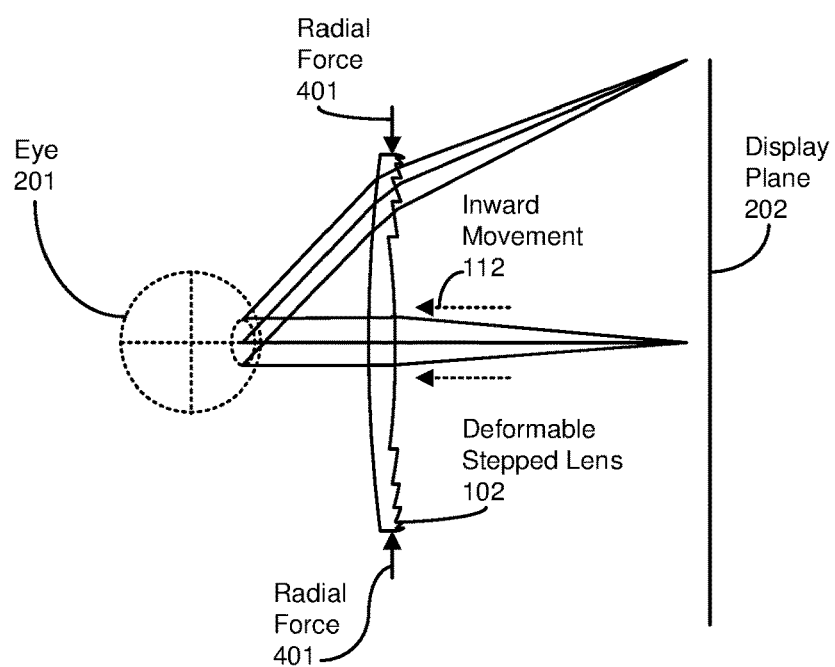
Figure 5:
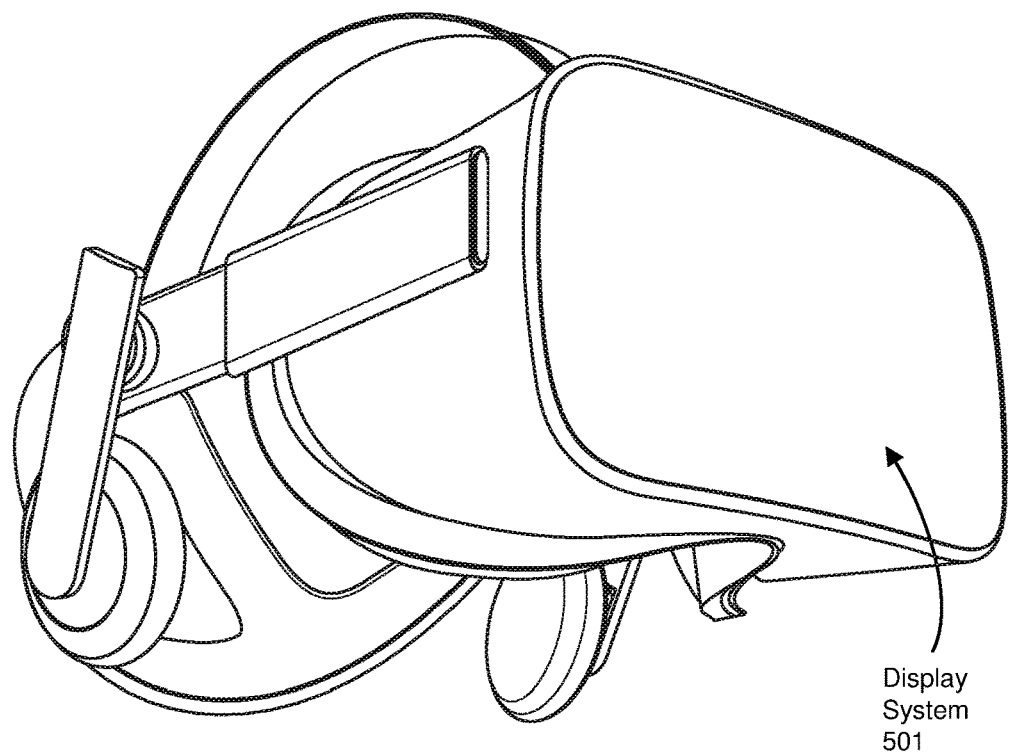
FIG. 5 is a perspective view of an exemplary head-mounted display (HMD) in which an exemplary display system may be employed that may include a varifocal apparatus having a deformable stepped lens.

The following will provide, with reference to FIGS. 1-12, detailed descriptions of varifocal apparatuses, systems, and methods that may include a deformable stepped lens. An exemplary apparatus including such a lens is discussed in conjunction with FIG. 1. A description of a deformable stepped lens to which a force may be applied to the deformable stepped lens to alter its shape, and thus its optical power, is presented in connection with FIGS. 2-4. An exemplary HMD is presented in reference to FIG. 5, and an exemplary display system that includes a deformable stepped lens employable in the exemplary HMD of FIG. 5 is discussed in connection with FIG. 6. Various embodiments of a varifocal apparatus that may include a deformable stepped lens are discussed with reference to FIGS. 7-9. A description of an exemplary system that may employ a varifocal system that includes a deformable stepped lens is presented in conjunction with FIG. 10. Further, a method of varifocal operation that may employ a deformable stepped lens is presented in reference to FIG. 11, and a method of providing a varifocal system that may include such a lens is provided in connection with FIG. 12.

FIG. 1 is a cross-sectional view of an exemplary varifocal apparatus 100 employing a deformable stepped lens 102. As the term is used herein, a deformable stepped lens may be any deformable (e.g., bendable, twistable, or otherwise flexible) lens that employs a stepped (e.g., discontinuous) surface on at least one side of the lens to provide an optical power similar to that of a thicker lens having a continuous surface on both sides of the lens. One example of a deformable stepped lens may be a deformable Fresnel lens, such as a Fresnel lens with a stepped surface that mimics the operation of a convex lens surface. In some examples, deformable stepped lens 102 may have a first side that is substantially flat and a second side opposite the first side that includes a plurality of concentric ridges or steps, such as that often seen in a Fresnel lens. However, other types of deformable stepped lenses may be employed in other embodiments.

As illustrated in FIG. 1, apparatus 100 may also include an actuator 104 coupled to deformable stepped lens 102 such that, when actuated, may apply force to deformable stepped lens 102 to alter its shape (e.g., from a first state to a second state). As a result of the change in shape, an optical power provided by deformable stepped lens 102 may be modified (e.g., from a first optical power associated with the first state to a second optical power associated with the second state). In some examples, such as that depicted in FIG. 1, actuator 104 may apply a radial force along a perimeter of deformable stepped lens 102 toward a center of deformable stepped lens 102 (e.g., with deformable stepped lens 102 initially being in a substantially flat or relaxed state). In at least some embodiments, deformable stepped lens 102 may be deformed to acquire a more "domed" shape or appearance, with a center of deformable stepped lens 102 moving toward the stepped surface (e.g., as outward movement 110) or away from the stepped surface (e.g., as inward movement 112), depending on the shape of deformable stepped lens 102, the force applied thereto by actuator 104, and/or other factors. In some examples, outward movement 110 of the center of deformable stepped lens 102 may result in a controllable decrease in optical power (e.g., an increase in focal length), while inward movement 112 of the center of deformable stepped lens 102 may result in a controllable increase in optical power (e.g., a decrease in focal length). In some embodiments, deformable stepped lens 102 may be made of a polymer (e.g., optically clear silicone) or other material that facilitates a lens of low modulus. Accordingly, in such embodiments, application of a rather modest force may cause a significant change in optical power provided by deformable stepped lens 102.

Further, in some embodiments, actuator 104 may apply a force at each of a plurality of distinct portions of deformable stepped lens 102, such as along the perimeter or other portions of deformable stepped lens 102. In such examples, each force may be represented as a corresponding force vector, and at least one of the force vectors may include a direction component that is different from a corresponding direction component of at least one other force vector. For example, each of multiple force vectors operating at a distinct location about a perimeter of deformable stepped lens 102 may be directed toward the center of deformable stepped lens 102, thus indicating that each force vector is directed in a different direction from any of the other force vectors. In other embodiments, actuator 104 may impart a force along a substantially continuous portion of deformable stepped lens 102, such as along a portion or an entirety of the perimeter thereof.

Figure 2:
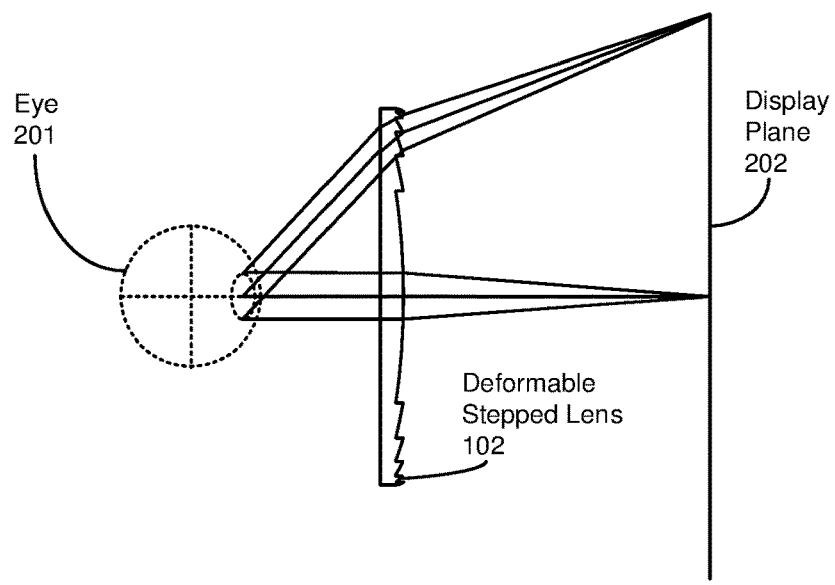
FIGS. 2-4 are cross-sectional views of the deformable stepped lens of FIG. 1 while providing different optical powers in corresponding states regarding the shape of the lens.

FIGS. 2-4 are cross-sectional views of deformable stepped lens 102 of FIG. 1 while providing different optical powers in corresponding states regarding the shape of deformable stepped lens 102. In each of these views, actuator 104 is not explicitly depicted therein to simplify the views and the associated discussion. More specifically in reference to FIG. 2, deformable stepped lens 102 may be in a relaxed state 200 (e.g., a state in which deformable stepped lens 102 is not subjected to a force that would cause a change from its natural shape). In relaxed state 200, in some examples, an eye 201 of a viewer and a display plane 202 (e.g., a light-emitting surface of a display device) may be positioned at opposing sides of deformable stepped lens 102 such that display plane 202 may be in focus at eye 201, as indicated by the selected light rays denoted in FIG. 2. In some examples, in relaxed state 200, deformable stepped lens 102 may provide some base level of optical power such that an image provided at display plane 202 may appear larger and/or closer to eye 201 that such an image would otherwise appear to eye 201 in the absence of deformable stepped lens 102.

FIG. 3 depicts deformable stepped lens 102 in a deformed state 300 in which a radial force 301 is applied to a perimeter of deformable stepped lens 102 such that the center of deformable stepped lens 102 exhibits outward movement 110 toward display plane 202. Consequently, as a result of radial force 301, deformable stepped lens 102 may acquire a domed shape (e.g., roughly parabolic in profile) directed toward display plane 202. In some examples, the change in shape of deformable stepped lens 102 from relaxed state 200 (e.g., in which deformable stepped lens 102 may be substantially flat) to deformed state 300 results in a reduction in optical power from the perspective of eye 201 (e.g., from a first optical power in relaxed state 200 to a second (lesser) optical power in deformed state 300). Consequently, presuming no changes in focusing in eye 201, eye 201 may be focused on a plane positioned beyond display plane 202. Also, in some embodiments, the reduction in optical power may also be attributed, at least in part, to a reduction in distance between the center of deformable stepped lens 102 and display plane 202.

FIG. 4 depicts deformable stepped lens 102 in another deformed state 400 in which a radial force 401 is applied to a perimeter of deformable stepped lens 102 such that the center of deformable stepped lens 102 exhibits inward movement 112 toward eye 201. Consequently, as a result of radial force 401, deformable stepped lens 102 may acquire a domed shape (e.g., roughly parabolic in profile) directed toward eye 201. In some embodiments, radial force 301 and radial force 401 may differ in some respect (e.g., by including an additional vector force component aside from a radial component, by applying force to a particular portion of the perimeter of deformable stepped lens 102, etc.) to cause either deformed state 300 or deformed state 400. In some examples, the change in shape of deformable stepped lens 102 from relaxed state 200 (e.g., in which deformable stepped lens 102 may be substantially flat) to deformed state 400 results in an increase in optical power from the perspective of eye 201 (e.g., from a first optical power in relaxed state 200 to a second (greater) optical power in deformed state 300). Consequently, presuming no changes in focusing of eye 201, eye 201 may be focused on a plane positioned in front of display plane 202. Also, in some examples, the increase in optical power may also be attributed, at least in part, to an increase in distance between the center of deformable stepped lens 102 and display plane 202.

In some embodiments, after an increase or decrease in optical power associated with deformable stepped lens 102 resulting from radial force 301 or radial force 401, eye 201 may alter its optical configuration (e.g., by altering the shape of its lens, by altering the size of its pupil, and so on) so that eye 201 may reacquire focus at display plane 202. Accordingly, the viewer may perceive the change in focus as a change in distance between an image presented at display plane 202 and eye 201. As a result, the use of radial force 301 and/or radial force 401 may generate a varifocal effect for eye 201 of the viewer. Moreover, in some examples, the magnitude of radial force 301 or radial force 401 may be related to the amount of change in the optical power provided by deformable stepped lens 102.

While the examples of FIGS. 2-4 indicate radial force 301 and/or radial force 401 are applied at a perimeter of deformable stepped lens 102, and are at least primarily directed toward a center of deformable stepped lens 102, alternative examples of a direction of a force and/or a location to which such a force is applied, are possible in other embodiments. For example, one or more forces may be applied to locations other than the perimeter of deformable stepped lens 102 in other embodiments, such as at one or both sides of deformable stepped lens 102 inside the perimeter. Also, the one or more forces may be applied to such alternative locations, such as away from the center of deformable stepped lens 102, or in other directions apart from toward the center of deformable stepped lens 102. Moreover, while relaxed state 200 of FIG. 2 represents an essentially flat state of deformable stepped lens 102, and deformed states 300 and 400 represent domed states of deformable stepped lens 102, other embodiments may employ different states in the absence or presence of external forces. In one example, a relaxed state of deformable stepped lens 102 in the absence of an external force may represent a domed shape of deformable stepped lens 102. Further, deformable stepped lens 102 may assume a deformed state representing a flat shape in response to one or more radial forces being directed away from the center of deformable stepped lens 102, such as by way of actuator 104 pulling an edge area of deformable stepped lens 102 away from its center. Other alternative embodiments are also possible.

FIG. 5 is a perspective view of an exemplary HMD 500 that may present images to the eyes (e.g., eye 201) of a viewer as part of a virtual reality (VR), augmented reality (AR), or mixed reality (MR) system. To present these images, HMD 500, in some embodiments, may include at least one exemplary display system 501 that may include a varifocal apparatus (e.g., apparatus 100) having a deformable stepped lens (e.g., deformable stepped lens 102). In some embodiments, two separate display systems 501, one per user eye, may be incorporated in HMD 500.

Figure 6:
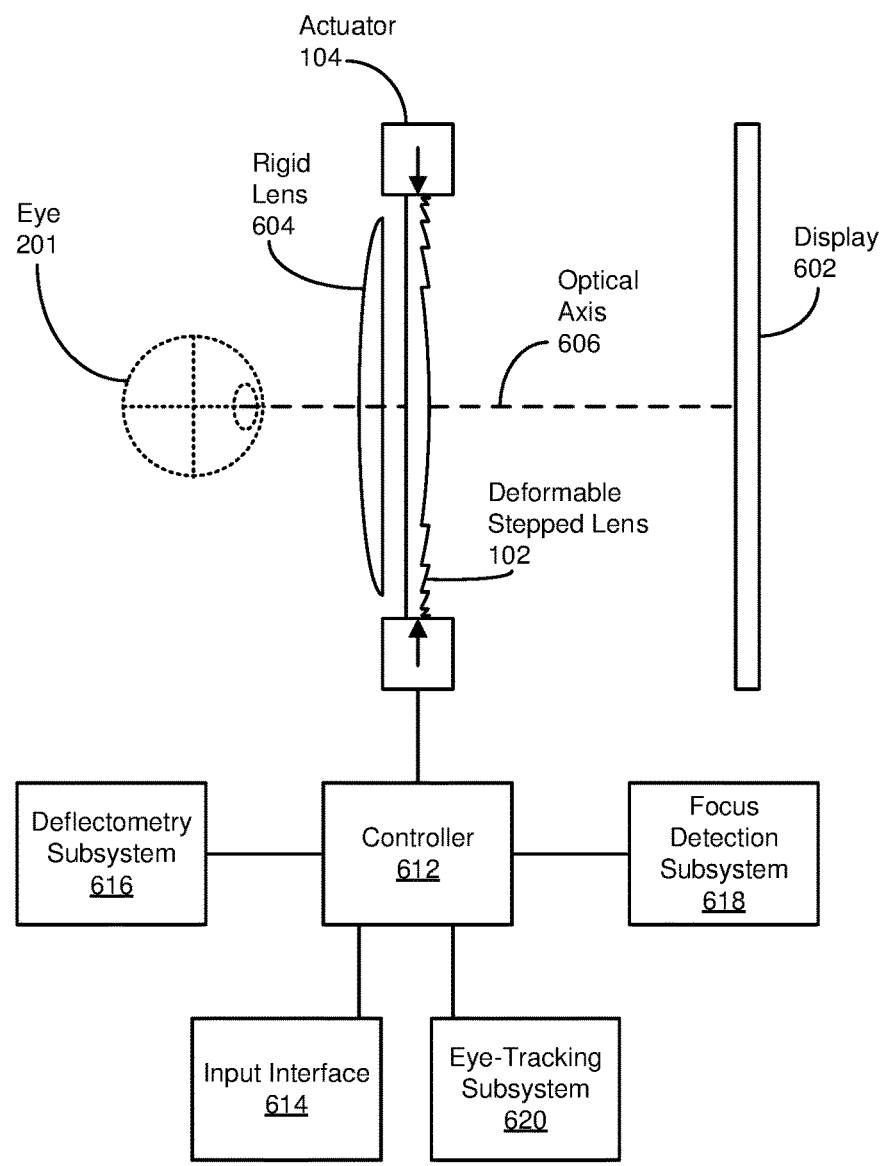
FIG. 6 is a side view of the exemplary display system of FIG. 5.

FIG. 6 is a side view of an exemplary display system 501 that may be employed within an HMD (e.g., HMD 500 of FIG. 5). As shown, display system 501 may include a display 602 (e.g., a liquid crystal display (LCD), a liquid crystal on silicon (LCoS) display, an organic light-emitting diode (OLED) display, and so on) located on an optical axis 606 with an eye 201 of a viewer. In some examples in which two display systems 501 are incorporated in a single HMD 500, a single shared display 602 may be used for both display systems 501.

Also located on optical axis 606, between display 602 and eye 201, may be deformable stepped lens 102, some embodiments of which are described above. Also, as discussed earlier, actuator 104 may be coupled to deformable stepped lens 102 to impart at least one force onto deformable stepped lens 102 to alter the optical power provided by deformable stepped lens 102.

In some examples, also located on optical axis 606 between eye 201 and deformable stepped lens 102 may be a rigid lens 604. In other examples, rigid lens 604 may be located between deformable stepped lens 102 and display 602. In some embodiments, rigid lens 604 may provide a base amount of optical power, such as to magnify an image provided by display 602 as perceived by eye 201 of the viewer. In some examples, the deformation or doming of deformable stepped lens 102 via actuator 104 may yield differing changes in focal length for different field angles. In some examples, these differences in focal length modification may be mitigated by varying the thickness of deformable stepped lens 102 as a function of the radius of deformable stepped lens 102 so that the amount and profile of curvature of deformable stepped lens 102 under varying levels of force applied by actuator 104 may be controlled. In such embodiments, rigid lens 604 may be dimensioned to compensate for the variation in thickness of deformable stepped lens 102. In other examples in which deformable stepped lens 102 may not be circular (e.g., roughly rectangular) as viewed by eye 201, rigid lens 604 may be dimensioned to compensate for that non-circular shape.

Also in display system 501, a controller 612 may be communicatively coupled to deformable stepped lens 102. Controller 612, in some embodiments, may include hardware logic, a processor (e.g., a microprocessor or microcontroller) that executes one or more software or firmware instructions, or some combination thereof. In some examples, controller 612 may identify an amount of force to be applied via actuator 104 to provide a corresponding level of optical power by deformable stepped lens 102. Controller 612, in some embodiments, may determine the desired amount of optical power based on input from an application (e.g., a virtual reality application) being executed in a system that includes at least HMD 500. Controller 612 may then direct actuator 104 to provide the identified amount of force to alter the shape of deformable stepped lens 102 to provide the desired optical power.

As depicted in FIG. 6, display system 501, in some embodiments, may include one or more of an input interface 614, a deflectometry subsystem 616, a focus detection subsystem 618, and/or an eye-tracking subsystem 620. In some examples, one or more of input interface 614, deflectometry subsystem 616, focus detection subsystem 618, and/or eye-tracking subsystem 620 may be included in, or located external to, HMD 500.

In some examples, input interface 614 may receive information (e.g., from the viewer) about an optical correction prescription of the viewer. Based at least in part on this information, controller 612 may identify the amount of force to be applied to deformable stepped lens 102 to control actuator 104. In some embodiments, the optical correction prescription may include a spherical component that may be provided by deformable stepped lens 102. Further, in some examples, the optical correction prescription may also include a cylindrical component and an axis component associated with astigmatism of eye 201. In such examples, controller 612 may identify a plurality of forces to be applied at different locations of deformable stepped lens 102 so that different amounts of optical power may be applied at different orientations about optical axis 606 according to the spherical, cylindrical, and axis components of the optical correction prescription. Thus, in such examples, the viewer may use HMD 500 without corrective eyewear, such as prescription glasses.

Input interface 614, in some embodiments, may provide a user interface (e.g., buttons, switches, keyboard, touchscreen, etc.) that the viewer may employ to enter the optical correction prescription information. In other examples, input interface 614 may be a communication interface (e.g., wired or wireless) coupled to a computer, smartphone, or other device that stores the optical correction prescription information. Further, in some embodiments, controller 612 may store the optical correction prescription or other information indicative thereof (e.g., control information for actuator 104 for providing the proper optical correction) in association with an identity of the viewer so that the information need not be reentered upon subsequent uses of HMD 500 by the user.

Deflectometry subsystem 616, if included in display system 501, may measure a current state of the shape of deformable stepped lens 102. Based on the current state of the shape of deformable stepped lens 102, controller 612 may select one or more forces to apply to deformable stepped lens 102 to alter or adjust the shape of deformable stepped lens 102 via actuator 104 to provide the desired level of optical power. In some examples, deflectometry subsystem 616 may employ any of several techniques involving optical detection, ultrasound detection, or others to detect the current shape of deformable stepped lens 102.

In some embodiments, focus detection subsystem 618, if included in display system 501, may detect a level of focus of an image provided by display 602 onto or into eye 201 of the viewer. Based at least in part on the detected level of focus, controller 612 may select one or more forces to apply to deformable stepped lens 102 to alter the shape of deformable stepped lens 102 via actuator 104 to provide the desired level of optical power for proper focus to eye 201. In other examples, controller 612 may select one or more forces to apply to deformable stepped lens 102 to alter the shape of deformable stepped lens 102 via actuator 104 to intentionally defocus the image from display 602 to cause an accommodation reflex in eye 201, as discussed above. In some examples, focus detection subsystem 618 may include an optical wavefront sensor or other device for detecting how an image may be perceived in eye 201.

In some examples, eye-tracking subsystem 620 (e.g., an infrared (IR) based tracking system), if included in display system 501, may provide information indicating a gaze angle of eye 201 (e.g., relative to optical axis 606). Based on this information, controller 612 may control the one or more forces imparted on deformable stepped lens 102 via actuator 104 based on that information. In some examples in which the deformation of deformable stepped lens 102 may yield different changes in focal length for different field angles, controller 612 may adjust the optical power provided via deformation of deformable stepped lens 102 based on the current gaze angle of eye 201 in lieu of varying the thickness of deformable stepped lens 102, as described above.

In some embodiments, controller 612 may receive information from deflectometry subsystem 616, focus detection subsystem 618, and/or eye-tracking subsystem 620 on a repetitive or ongoing basis and control actuator 104 accordingly to provide a desired optical power via deformable stepped lens 102 over time. In some examples, controller 612 may implement a closed-loop feedback control system based on the information received from deflectometry subsystem 616, focus detection subsystem 618, and/or eye-tracking subsystem 620.

Figure 7:
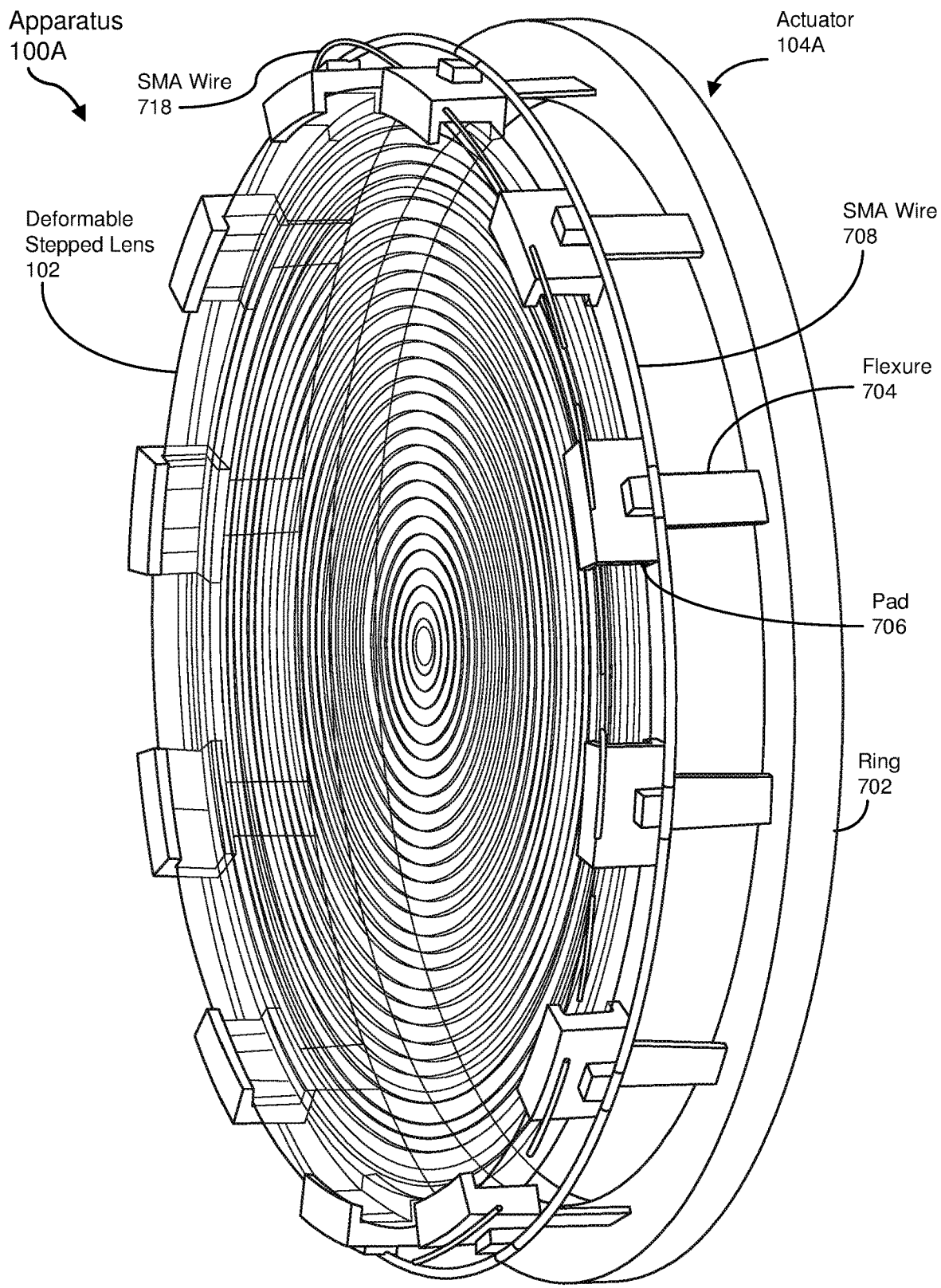
FIG. 7 is perspective view of an exemplary varifocal apparatus that may include a deformable stepped lens.

FIG. 7 is perspective view of an exemplary varifocal apparatus 100A that may include a deformable stepped lens (e.g., deformable stepped lens 102). In some embodiments, apparatus 100A may also include an actuator 104A having a ring 702, a plurality of pads 706 contacting the perimeter of deformable stepped lens 102, a plurality of flexures 704 extending substantially perpendicularly from ring 702 and connecting pads 706 to ring 702, and a first shape-memory alloy (SMA) wire 708 (e.g., shaped as a ring) routed about pads 706. In other embodiments, first SMA wire 708 may be routed about flexures 704. In some examples, first SMA wire 708 may be a Nitinol (nickel-titanium alloy) wire, although other alloys or materials may be utilized in other embodiments. As depicted in FIG. 7, pads 706 and flexures 704 are positioned equidistant about deformable stepped lens 102 and ring 702, although such an arrangement may not be utilized in other embodiments.

In some examples, when no electrical current is carried by first SMA wire 708, first SMA wire 708 may retain a length such that essentially no radial force is applied via pads 706 to the perimeter of deformable stepped lens 102, which thus retains a relaxed state (e.g., relaxed state 200) providing a first optical power. In some embodiments, in response to carrying electrical current, first SMA wire 708 may heat accordingly, causing a reduction in its length, thus forcing pads 706 toward the center of deformable stepped lens 102, thereby deforming the lens into a substantially domed shape and altering the optical power of deformable stepped lens 102, as discussed earlier. In some embodiments, controller 612 may directly or indirectly provide an amount of current to first SMA wire 708 that is appropriate to cause deformable stepped lens 102 to provide the desired amount of optical power.

In the embodiment of FIG. 7, first SMA wire 708 is positioned toward a side of pads 706 closest to flexures 704 such that, when first SMA wire 708 is heated, the center of deformable stepped lens 102 may protrude away from ring 702 so that deformable stepped lens 102 acquires a first deformed state (e.g., deformed state 300). In other examples, in addition to or in lieu of first SMA wire 708, a second SMA wire 718 (the position thereof indicated via dashed line in FIG. 7) may be positioned toward a side of pads 706 furthest from flexures 704 such that, when second SMA wire 718 is heated, the center of deformable stepped lens 102 may protrude toward ring 702 so that stepped deformable stepped lens 102 acquires a second deformed state (e.g., deformed state 400). In embodiments in which both first SMA wire 708 and second SMA wire 718 are used, SMA wires 708 and 718 may be located on opposing sides of a plane defined by the perimeter of deformable stepped lens 102 so that deformable stepped lens 102 may be domed in either direction relative to ring 702, thus potentially extending the range of optical powers that may be provided by deformable stepped lens 102.

In some embodiments, multiple SMA wires may be employed instead of a single, thicker SMA wire, such as first SMA wire 708 or second SMA wire 718. In doing so, the multiple SMA wires may provide a similar level of radial force to deformable stepped lens 102 when heated, while possibly cooling more quickly due to exhibiting a greater surface area than a single SMA wire 708 or 718, thus possibly facilitating a more responsive relaxation of deformable stepped lens 102 when the flowing of current through the multiple SMA wires ceases.

Unlike the example of deformable stepped lens 102 of FIG. 7, the perimeter of deformable stepped lens 102 may not be circular, in some examples. In such cases, flexures 704 may be of different thicknesses, or the distribution of flexures 704 and pads 706 about the perimeter of deformable stepped lens 102 may not be equidistant, so that a distribution of the force imparted by first SMA wire 708 and/or second SMA wire 718 may actuate deformable stepped lens 102 in a rotationally symmetrical dome shape about the center of deformable stepped lens 102.

In some embodiments, an actuator component other than first SMA wire 708 or second SMA wire 718 may be employed to provide the radial force by way of flexures 704 and pads 706, such as electroactive polymers (EAPs) that may lengthen and contract in response to an electric field.

In some examples, controller 612 may compensate for a hysteretic response of apparatus 100A. More specifically, apparatus 100A may require some period of time during which current flows before first SMA wire 708 or second SMA wire 718 imparts a desired force on the perimeter of deformable stepped lens 102, and may require cooling for some period of time after current ceases to flow prior to first SMA wire 708 or second SMA wire 718 lengthening, thus returning deformable stepped lens 102 to its relaxed state (e.g., relaxed state 200). In such embodiments, controller 612 may implement a predictive control loop to anticipate the need to alter the current through first SMA wire 708 or second SMA wire 718. In other examples, the controller 612 may also employ eye-tracking subsystem 620 to anticipate the need to alter the current to first SMA wire 708 or second SMA wire 718, such as by anticipating a future gaze angle of eye 201 based on a current gaze angle, a direction and/or rate of change of gaze angle, and the like.

Figure 8:
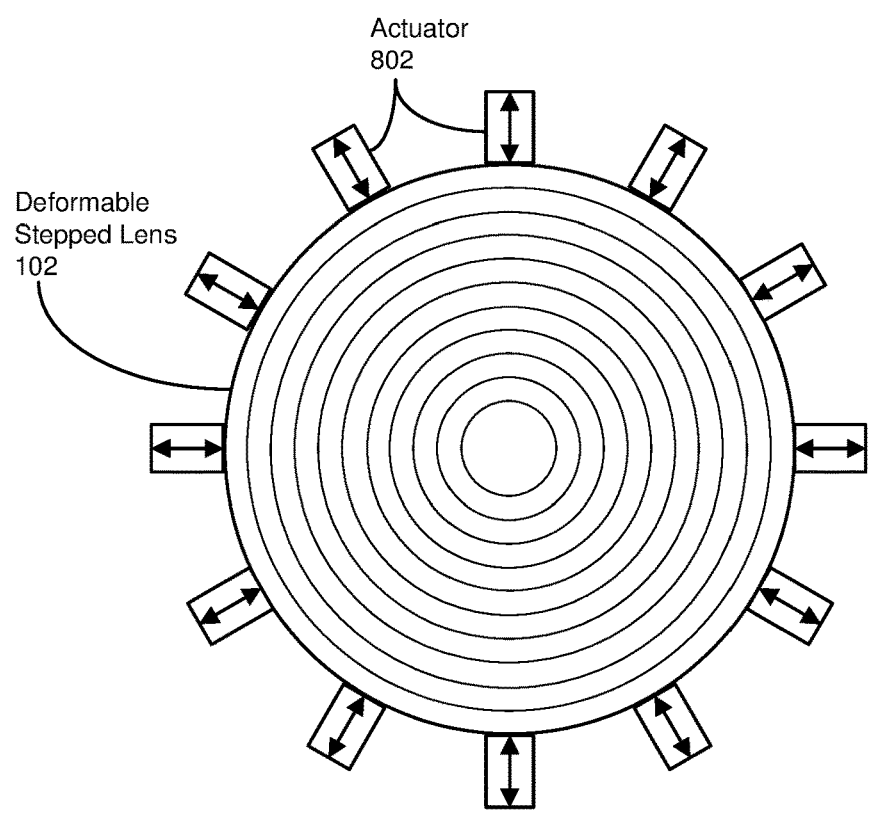
FIG. 8 is a front view of another exemplary varifocal apparatus that may include a deformable stepped lens.

FIG. 8 is a front view of another exemplary varifocal apparatus 100B that may include a deformable stepped lens (e.g., deformable stepped lens 102). In addition to deformable stepped lens 102, apparatus 100B may include a plurality of actuators 802 (e.g., collectively operating as actuator 104 of FIG. 1), each of which may impart a radial force toward the center of deformable stepped lens 102 to alter the optical power of deformable stepped lens 102. As depicted in FIG. 8, actuators 802 may be spaced equidistant about the perimeter of deformable stepped lens 102, although other spacings may be employed in other embodiments. Further, in some examples, such as when deformable stepped lens 102 is circular (e.g., as in FIG. 8), actuators 802 may each simultaneously impart the same magnitude of force to each associated location of deformable stepped lens 102, such as to provide an optical power that is substantially the same in all directions about optical axis 606 (e.g., rotationally symmetrical about the center of deformable stepped lens 102). In other embodiments, such as when providing correction for astigmatism of eye 201, different amounts of force may be applied by actuators 802 to provide an optical power that varies about optical axis 606, such as to accommodate astigmatism of eye 201. Also, in some examples, actuators 802 may be positioned and/or oriented relative to the perimeter of deformable stepped lens 102 to force deformable stepped lens 102 to protrude in one direction or another when the force is applied, in a manner analogous to that provided above by apparatus 100A of FIG. 7. Examples of actuators 802 include, but are not limited to, stepper motors, each of which controller 612 may control independently.

Figure 9:
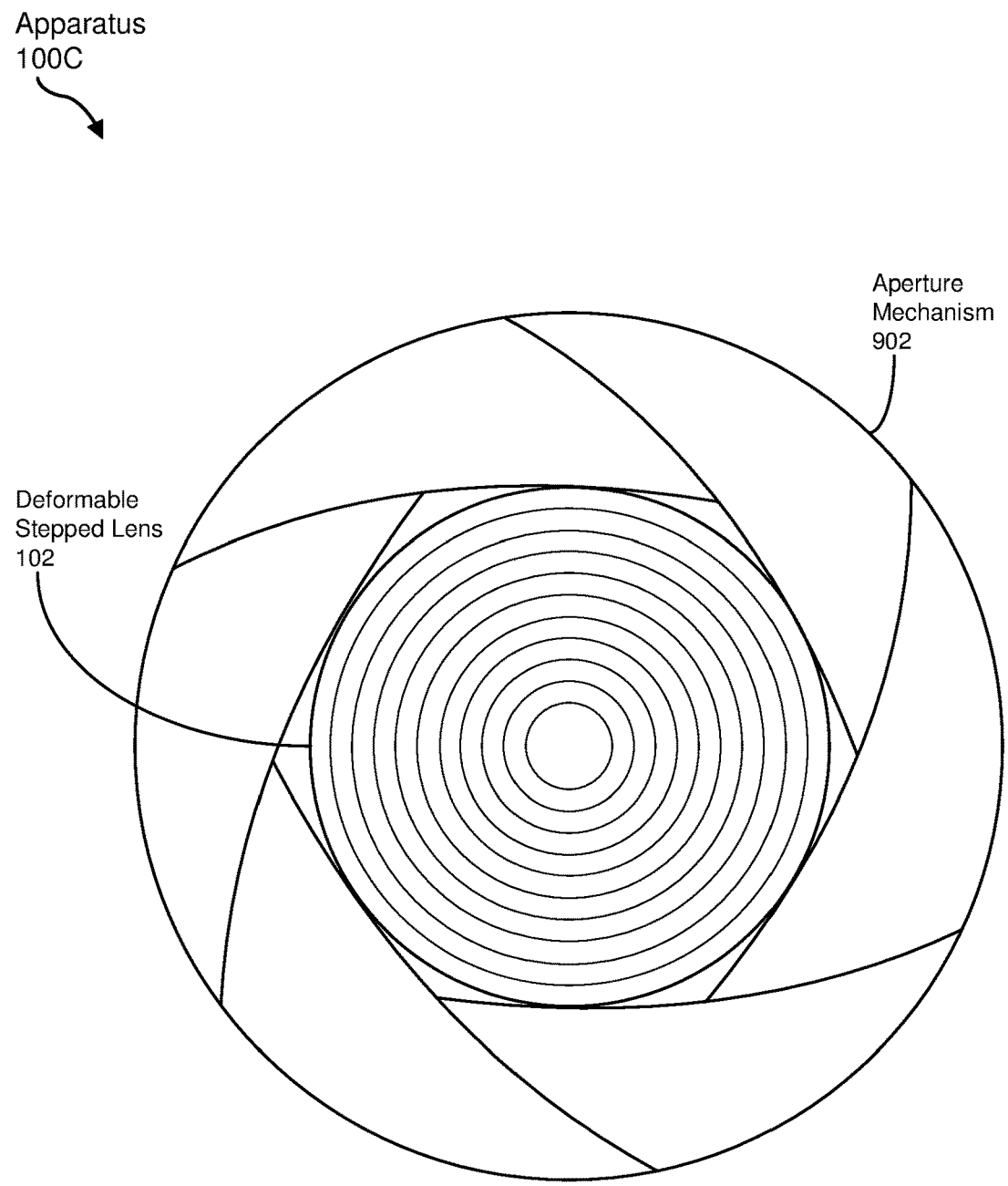
FIG. 9 is a front view of yet another exemplary varifocal apparatus that may include a deformable stepped lens

FIG. 9 is a front view of yet another exemplary varifocal apparatus 100C that may include a deformable stepped lens (e.g., deformable stepped lens 102). In some embodiments, apparatus 100C may include an aperture mechanism 902 that may be driven by a single actuation motor (e.g., a stepper motor) not explicitly depicted in FIG. 9. Aperture mechanism 902, in response to a force provided by the actuation motor, may apply a force at multiple points on the perimeter of deformable stepped lens 102. In some examples, aperture mechanism 902 may be arranged in a fashion similar to a traditional camera aperture mechanism, with multiple overlapping segments that move simultaneously based on the force from the actuation motor to increase or reduce a radial force at each contact point along the perimeter of deformable stepped lens 102 by a segment of aperture mechanism 902. In some examples, the number of contact points may equal the number of segments. While six contact points are illustrated in FIG. 9, greater or fewer numbers of contact points and segments may be employed in other examples, with a greater number of points possibly providing a more evenly distributed radial force about the perimeter of deformable stepped lens 102.

Figure 10:
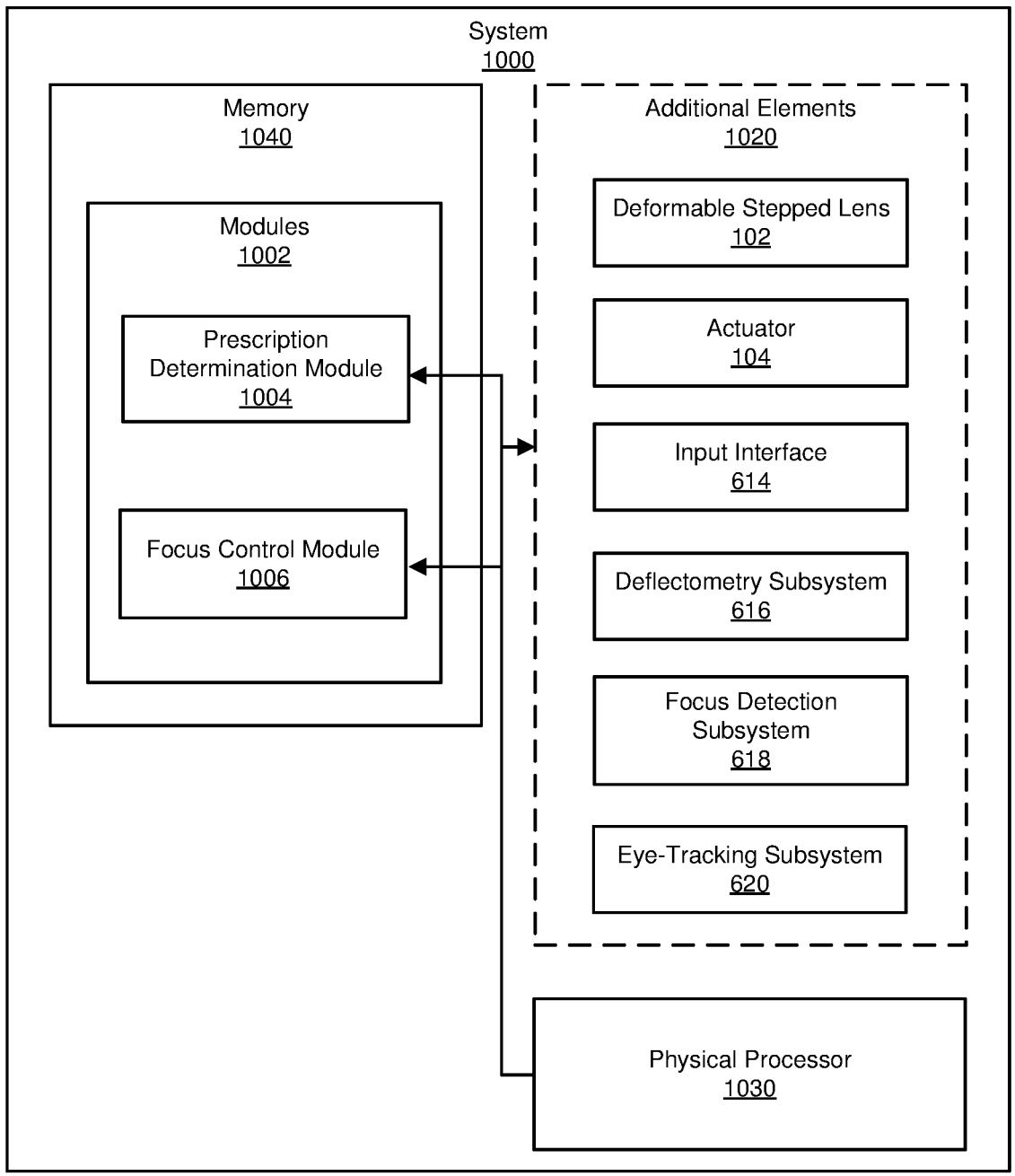
FIG. 10 is a block diagram of an exemplary system that may employ a varifocal apparatus that includes a deformable stepped lens.

FIG. 10 is a block diagram of an exemplary system 1000 that may employ a varifocal apparatus (e.g., apparatus 100, 100A, 100B, or 100C) that includes a deformable stepped lens (e.g., deformable stepped lens 102). As illustrated in FIG. 10, exemplary system 1000 may include one or more modules 1002 for performing one or more tasks. As will be explained in greater detail below, modules 1002 may include a prescription determination module 1004 and a force control module 1006. Although illustrated as separate elements, one or more of modules 1002 in FIG. 10 may represent portions of a single module or application.

In the example embodiments described in greater detail below, system 1000 may be employed as at least a portion of a display system (e.g., display system 501 of FIGS. 5 and 6) for providing varifocal functionality for users of an HMD (e.g., HMD 500 of FIG. 5) or other display device. Such a system may include additional elements 1020, such as deformable stepped lens 102, actuator 104, input interface 614, deflectometry subsystem 616, focus detection subsystem 618, and/or eye-tracking subsystem 620. Additionally, one or more modules 1002 and/or additional elements 1020 (e.g., input interface 614), or portions thereof, may reside outside HMD 500 or other display device.

Prescription determination module 1004, in some embodiments, may receive viewer identification information (e.g., from input interface 614) and corresponding optical correction prescription information. Based on such information, prescription determination module 1004 may store information indicative of the prescription (e.g., the optical correction prescription itself, control information for actuator 104, or the like) for each viewer.

In some examples, focus control module 1006 may receive information to identify or generate a desired optical power that is to be provided by way of imparting a force onto deformable stepped lens 102 via actuator 104. Such information, as discussed above, may include optical correction prescription information, information from a VR or similar application, a current gaze angle of the user, a proposed accommodation response to be elicited from the eyes of the user, a current force being applied via actuator 104, relationships between force and optical power provided by deformable stepped lens 102, and/or the like. From such information, focus control module 1006 may generate control information for actuator 104 to impart a force on deformable stepped lens 102 to provide a desired optical power for the eyes of the viewer. In some examples, the optical power may facilitate the focusing of the image from a display (e.g., display 602 of FIG. 6) onto the eyes, and/or may facilitate slight off-focusing of such an image to elicit the accommodation reflex.

In certain embodiments, one or more of modules 1002 in FIG. 10 may represent one or more software applications or programs that, when executed by a computing device, may cause the computing device to perform one or more tasks. One or more of modules 1002 in FIG. 10 may also represent all or portions of one or more special-purpose computers configured to perform one or more tasks.

As illustrated in FIG. 10, system 1000 may also include one or more memory devices, such as memory 1040. Memory 1040 generally represents any type or form of volatile or non-volatile storage device or medium capable of storing data and/or computer-readable instructions. In one example, memory 1040 may store, load, and/or maintain one or more of modules 1002. As illustrated in FIG. 10, system 1000 may also include one or more physical processors, such as physical processor 1030, that may access and/or modify one or more of modules 1002 stored in memory 1040, thus operating as controller 612 of FIG. 6. Additionally or alternatively, physical processor 1030 may execute one or more of modules 1002. In yet other examples, one or more of modules 1002, or portions thereof, instead may be implemented as hardware components not stored in memory 1040, such as electronic circuitry for performing one or more tasks described above. Additionally, in some examples, memory 1040 may include information generated and/or employed by modules 1002 (e.g., viewer identifiers, information describing optical correction prescriptions of the viewers, control information for actuator 104, and so on), as described above.

In other examples, some functionality described above as performed by physical processor 1030 executing modules 1002 may instead be performed by special-purpose circuitry included in system 1000.

Figure 11:
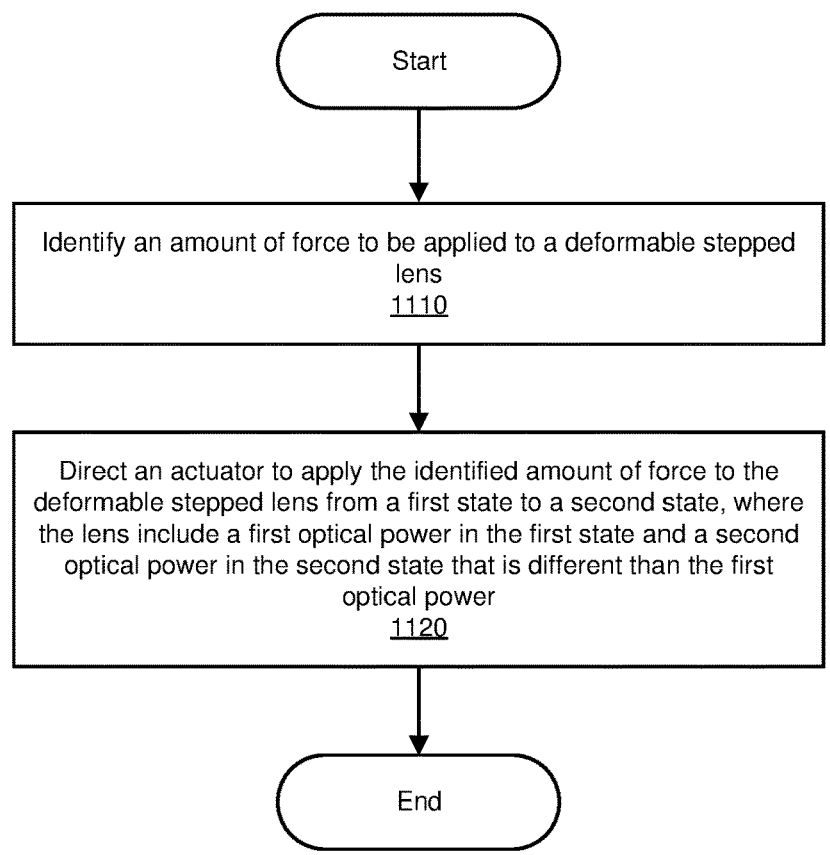
FIG. 11 is a flow diagram of an exemplary method of varifocal operation that may employ a deformable stepped lens.

FIG. 11 is a flow diagram of an exemplary method 1100 of varifocal operation that may employ a deformable stepped lens (e.g., deformable stepped lens 102). The steps shown in FIG. 11 may be performed by any suitable computer-executable code and/or computing system, including the system(s) illustrated in FIGS. 6 and 10. In one example, each of the steps shown in FIG. 11 may represent an algorithm whose structure includes and/or is represented by multiple sub-steps, examples of which are described above in greater detail.

As illustrated in FIG. 11, at step 1110, an amount of force to be applied to the deformable stepped lens may be identified (e.g., by focus control module 1006). In some embodiments, the amount of force may be based on a particular optical power to be provided by the deformable stepped lens in view of one or more sources of information, including, but not limited to, optical correction prescription information (e.g., received via prescription determination module 1004) for the eyes of the viewer, VR application information, current gaze angle information, information relating force magnitudes to resulting optical powers provided by the deformable stepped lens, and/or the like. At step 1120, an actuator (e.g., actuator 104) may be directed to apply the identified amount of force to the deformable stepped lens from a first state to the second state, where the deformable stepped lens may include or provide a first optical power in the first state and a second optical power in the second state that is different than the first optical power.

Figure 12:
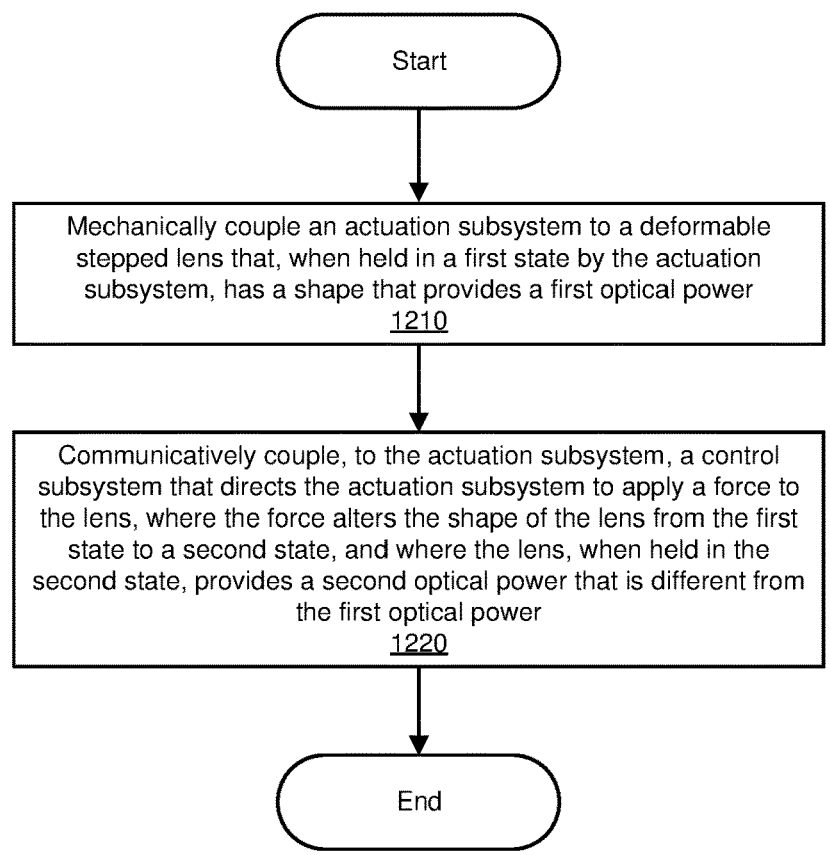
FIG. 12 is a flow diagram of an exemplary method of providing a varifocal system that may include a deformable stepped lens.

FIG. 12 is a flow diagram of an exemplary method 1200 of providing a varifocal system (e.g., display system 501 of FIG. 6) that may include a deformable stepped lens (e.g., deformable stepped lens 102). At step 1210, an actuation subsystem (e.g., actuator 104) may be mechanically coupled to the deformable stepped lens that, when held in a first state by the actuation subsystem, has a shape that provides a first optical power. In some examples, the first state may be a relaxed state, in which a force is not being imparted onto the deformable stepped lens, or may be deformed state, in which at least some force is being imparted onto the deformable stepped lens. At step 1220, a control subsystem (e.g., including controller 612) may be communicatively coupled to the actuation subsystem to direct the actuation subsystem to apply a force to the deformable stepped lens, where the force alters the shape of the lens from the first state to a second state, and where the lens, when held in the second state, provides a second optical power that is different from the first optical power.

As explained above in conjunction with FIGS. 1 through 12, the apparatuses, systems, and methods described herein may facilitate a varifocal optical system, such as what may be employed in an HMD or other display system. In some examples, the use of a deformable stepped lens and corresponding actuator, as described above, may provide a low-power, volume-efficient means of providing accurate focus for the eyes of a viewer, such as for focusing on an image of a display. Moreover, in some embodiments, the apparatuses, systems, and methods herein may also take into account an optical correction prescription of the viewer, thus possibly relieving the viewer of the burden of wearing corrective eyewear, such as prescription glasses, when viewing the display. In addition, slight changes in force imparted by the actuator on the deformable stepped lens may result in slight alterations in optical power, which may be useful in eliciting an optical accommodation reflex in the eyes of the viewer, thus potentially lending a greater degree of realism to the images presented to the user by the display system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data (e.g., application data, optical correction data, etc.) to be transformed, and transform the received data into control signals for an actuator to provide a desired optical power via a deformable stepped lens. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a deformable stepped lens that:
        provides a first optical power when a shape of the deformable stepped lens comprises a first state; and
        provides a second optical power different from the first optical power when the shape of the deformable stepped lens comprises a second state different from the first state; and
    an actuator coupled to the deformable stepped lens that is configured to apply an amount of force identified with the second optical power to the deformable stepped lens to alter the shape of the deformable stepped lens from the first state to the second state.

2. The apparatus of claim 1, wherein the actuator applies the force about a perimeter of the deformable stepped lens toward a center of the deformable stepped lens.

3. The apparatus of claim 2, wherein the force applied by the actuator moves the center of the deformable stepped lens either:
    toward an eye of a viewer so that the second optical power is greater than the first optical power; or
    away from the eye of the viewer so that the second optical power is less than the first optical power.

4. The apparatus of claim 2, wherein:
    the actuator comprises:
        a ring;
        a plurality of pads contacting the perimeter of the deformable stepped lens;
        a plurality of flexures connecting the plurality of pads to the ring; and
        a first shape-memory alloy (SMA) wire routed about the actuator via at least one of:
            one or more of the plurality of pads; or
            one or more of the plurality of flexures; and
    the first SMA wire applies the force in response to carrying electrical current.

5. The apparatus of claim 4, wherein:
    the actuator further comprises a second SMA wire routed about the actuator at the plurality of pads;
    the second SMA wire applies a second force about the perimeter of the deformable stepped lens toward the center of the deformable stepped lens in response to carrying electrical current; and the second SMA wire is located relative to the first SMA wire such that the second force causes the center of the deformable stepped lens to move in an opposite direction to that caused by the force applied by the first SMA wire.

6. The apparatus of claim 5, wherein the first SMA wire and the second SMA wire are located on opposing sides of a plane defined by the perimeter of the deformable stepped lens.

7. The apparatus of claim 4, wherein:
the perimeter of the deformable stepped lens is circular; and
the plurality of flexures are of a same thickness such that:
the same force is applied at each of the plurality of pads onto the perimeter of the deformable stepped lens; and
the shape of the deformable stepped lens is symmetrical about the center of the deformable stepped lens when the deformable stepped lens is in a deformed state as a result of the force being applied at each of the plurality of pads.

8. The apparatus of claim 4, wherein:
the perimeter of the deformable stepped lens is not circular; and
the plurality of flexures vary in thickness to apply differing forces at the plurality of pads onto the perimeter of the deformable stepped lens so that the shape of the deformable stepped lens is symmetrical about the center of the deformable stepped lens when the deformable stepped lens is in a deformed state as a result of the force applied at each of the plurality of pads.

9. The apparatus of claim 1, wherein:
the actuator applies the force in a manner that results in:
a first force vector being applied at a first portion of the deformable stepped lens; and
a second force vector being applied at a second portion of the deformable stepped lens.

10. The apparatus of claim 9, wherein the first force vector comprises a direction component that is different than a direction component of the second force vector.

11. The apparatus of claim 9, wherein the actuator comprises a plurality of actuators that has:
a first actuator that applies the first force vector to the first portion of the deformable stepped lens; and
a second actuator that applies the second force vector to the second portion of the deformable stepped lens.

12. The apparatus of claim 9, further comprising an aperture mechanism that:
is coupled to the deformable stepped lens at a plurality of different locations, wherein the plurality of different locations comprises the first and second portions of the deformable stepped lens; and
when actuated by the actuator, applies the force to the deformable stepped lens at each of the plurality of different locations.

13. The apparatus of claim 1, further comprising a rigid lens that is located between the deformable stepped lens and an eye of a viewer and that provides an additional optical power, wherein the rigid lens is dimensioned to compensate for a thickness of the deformable stepped lens that differs as a function of a radius of the deformable stepped lens.

14. The apparatus of claim 1, wherein:
the deformable stepped lens comprises at least one substantially flat side; and
a side of the deformable stepped lens opposite the substantially flat side comprises a plurality of concentric ridges.

15. The apparatus of claim 1, further comprising:
a display subsystem that generates an image for viewing by a viewer, wherein the actuator holds the deformable stepped lens between a display and an eye of the viewer;
a control subsystem that directs the actuator to apply the force to the deformable stepped lens; and
a deflectometry subsystem that measures a current state of the shape of the deformable stepped lens, wherein the control subsystem selects the force applied to the deformable stepped lens based, at least in part, on the current state of the shape of the deformable stepped lens.

16. A method comprising:
identifying an amount of force to be applied to a deformable stepped lens; and
directing an actuator to apply the identified amount of force to the deformable stepped lens to alter a shape of the deformable stepped lens from a first state to a second state, wherein:
the deformable stepped lens comprises a first optical power in the first state;
the deformable stepped lens comprises a second optical power in the second state; and
the first optical power is different than the second optical power.

17. The method of claim 16, wherein identifying the amount of force comprises:
detecting a level of focus of an image being projected through the deformable stepped lens onto an eye of a viewer; and
determining, based on the level of focus, the amount of force to be applied to the deformable stepped lens.

18. The method of claim 16, wherein identifying the amount of force comprises:
receiving, at an input subsystem, information about an optical correction prescription of a viewer; and
determining, based at least in part on the optical correction prescription, the amount of force to be applied to the deformable stepped lens.

19. The method of claim 18, wherein:
receiving the information about the optical correction prescription comprises receiving information about a cylindrical component of the optical correction prescription;
determining the amount of force to be applied is based on the cylindrical component;
the first optical power comprises a first cylindrical power; and
the second optical power comprises a second cylindrical power that is different than the first cylindrical power and that at least partially corrects for an astigmatism of the viewer.

20. A method comprising:
mechanically coupling an actuation subsystem to a deformable stepped lens that, when held in a first state by the actuation subsystem, has a shape that provides a first optical power; and
communicatively coupling, to the actuation subsystem, a control subsystem that:
identifies an amount of force to be applied to the deformable stepped lens; and
directs the actuation subsystem to apply the amount of force to the deformable stepped lens, wherein:

the amount of force alters the shape of the deformable stepped lens from the first state to a second state; and the deformable stepped lens, when held in the second state by the actuation subsystem, provides a second optical power that is different than the first optical power.

\* \* \* \* \*